US00RE35967E

United States Patent [19]

Lauer et al.

[11] E Patent Number: Re. 35,967

[45] Reissued Date of Patent: Nov. 24, 1998

[54] PROCESS OF MAKING ELECTRICAL STEELS

[75] Inventors: Barry A. Lauer, Macedonia; Gerald F. Beatty, Solon, both of Ohio; Ann M. R. Larson, Appleton, Wis.; Richard J. Blotzer, Parma, Ohio

[73] Assignee: LTV Steel Company, Inc., Cleveland, Ohio

[21] Appl. No.: 897,747

[22] Filed: Jul. 21, 1997

Related U.S. Patent Documents

Reissue of:

[64] Patent No.: 5,609,696
Issued: Mar. 11, 1997
Appl. No.: 502,675
Filed: Jul. 14, 1995

U.S. Applications:

[63] Continuation of Ser. No. 233,371, Apr. 26, 1994, abandoned.

[51] Int. Cl.[6] ..... H01F 1/04

[52] U.S. Cl. ..... 148/111; 148/112; 148/120

[58] Field of Search ..... 148/111, 112, 148/120

[56] References Cited

U.S. PATENT DOCUMENTS

| | | | |
|---|---|---|---|
| 2,067,036 | 1/1937 | Wimmer | 148/111 |
| 2,303,343 | 12/1942 | Engel et al. | 148/111 |
| 2,351,922 | 6/1944 | Burgwin | 148/111 |

(List continued on next page.)

FOREIGN PATENT DOCUMENTS

| | | |
|---|---|---|
| 1438853 | 4/1966 | France . |
| 1550182 | 12/1968 | France . |
| 63-47332 | 2/1988 | Japan . |
| 63-210237 | 8/1988 | Japan . |
| 1-198428 | 8/1989 | Japan . |
| 4280921 | 6/1992 | Japan . |
| 631548 | 5/1978 | Russian Federation . |

OTHER PUBLICATIONS

European Search Report (EP 95 30 2553), Aug. 14, 95.
"Closing The Gap With Electrical Lamination Steels", dated Oct. 4–9, 1986, by Dunkle and Goodenow; ASM's Material Week 1986.
Sales Order by PSW Industries, Inc. Purchase Order No. 13159, dated 25 Mar. 1994.
Sales Order by Matsushita Refrig. Co. of America c/o Berwick Steel Purchase Order No. 13562–001, dated 22 Mar. 1993.
Sales Order by Berwick Steel Co., Purchase Order No. 13680–001, dated 8 Apr. 1993.
Sales Order by PSW Industries Inc., Purchase Order No. 13159, dated 6 Jun. 1994.
Sales Order by PSW Industries, Inc., Purchase Order No. 13159, dated 11 May 1994.
Sales Order by Berwick Steel Company, Purchase Order No. 13562–001, Purchase Order Date—10 Mar. 1993.
Sales Order by Berwick Steel Co., Purchase Order No. 13053–003, Purchase Order Date—21 Dec. 1992.
Sales Order by Berwick Steel Co., Purchase Order No. 13053–003, Purchase Order Date—22 Dec. 1992.

*Primary Examiner*—Sikyin Ip
*Attorney, Agent, or Firm*—Watts, Hoffmann, Fisher & Heinke, Co., L.P.A.

[57] ABSTRACT

Batch annealed, semi-processed and fully processed motor lamination steels are made by processes which subject a slab having an ultra low carbon composition (less than 0.01%) to at least the following steps: hot rolling with an austenite finishing temperature, coiling at a temperature ranging from 1300°–1450° F., and light temper rolling (less than 1.0% reduction) or leveling; reheating at a temperature less than 2300° F., hot rolling with a ferrite finishing temperature, coiling at a temperature less than 1200° F., and light temper rolling or leveling; or hot rolling with a ferrite finishing temperature, coiling at a temperature ranging from 1100°–1350° F. without a subsequent hot band anneal, and light temper rolling or leveling.

23 Claims, 3 Drawing Sheets

U.S. PATENT DOCUMENTS

| | | | |
|---|---|---|---|
| 2,412,041 | 12/1946 | Gifford et al. | 148/110 |
| 2,986,485 | 5/1961 | Fitz et al. | 148/112 |
| 3,130,088 | 4/1964 | Cook | 72/160 |
| 3,188,250 | 6/1965 | Holbelm et al. | 148/120 |
| 3,212,942 | 10/1965 | Takahashi | 148/111 |
| 3,297,434 | 1/1967 | Litman et al. | 148/121 |
| 3,415,696 | 12/1968 | Gimigliano | 148/111 |
| 3,620,856 | 11/1971 | Hiraoka | 148/121 |
| 3,770,517 | 11/1973 | Gray et al. | 148/111 |
| 3,873,380 | 3/1975 | Malagasi | 148/111 |
| 3,892,604 | 7/1975 | Thornburg et al. | 148/120 |
| 3,895,974 | 7/1975 | Watanabe et al. | 148/111 |
| 3,923,560 | 12/1975 | Regitz | 148/120 |
| 3,932,237 | 1/1976 | Irie et al. | 148/113 |
| 3,940,299 | 2/1976 | Goto et al. | 148/111 |
| 3,954,521 | 5/1976 | Malagari | 148/111 |
| 4,066,479 | 1/1978 | Shimoyama et al. | 148/541 |
| 4,123,298 | 10/1978 | Kohler et al. | 148/111 |
| 4,204,890 | 5/1980 | Irie et al. | 148/111 |
| 4,306,922 | 12/1981 | Coombs et al. | 148/111 |
| 4,319,936 | 3/1982 | Dahlstrom et al. | 148/111 |
| 4,337,101 | 6/1982 | Malagari | 148/111 |
| 4,390,378 | 6/1983 | Rastogi | 148/111 |
| 4,666,534 | 5/1987 | Miyoshi et al. | 148/111 |
| 4,772,341 | 9/1988 | Rastogi et al. | 148/307 |
| 4,979,997 | 12/1990 | Kobayashi et al. | 148/111 |
| 5,009,726 | 4/1991 | Nishimoto et al. | 148/111 |
| 5,013,372 | 5/1991 | Honda et al. | 148/111 |
| 5,045,129 | 9/1991 | Barisoni | 148/111 |
| 5,049,205 | 9/1991 | Takahashi et al. | 148/111 |
| 5,062,905 | 11/1991 | Tomita et al. | 148/111 |
| 5,096,510 | 3/1992 | Schoen et al. | 148/111 |
| 5,102,478 | 4/1992 | Hosoya et al. | 148/111 |
| 5,108,521 | 4/1992 | Hosoya et al. | 148/111 |
| 5,143,561 | 9/1992 | Kitamura et al. | 148/111 |
| 5,145,533 | 9/1992 | Yoshitomi et al. | 148/111 |

PROCESS OF MAKING ELECTRICAL STEELS

Matter enclosed in heavy brackets [ ] appears in the original patent but forms no part of this reissue specification; matter printed in italics indicates the additions made by reissue.

RELATED PRIOR APPLICATION

This application is a continuation or U.S. Ser. No. 08/233,371, filed Apr. 26, 1994, which is now abandoned.

BACKGROUND OF THE INVENTION

The present invention relates generally to the production of electrical steels, and more specifically to cold rolled, batch annealed and temper rolled motor lamination steels having good processing and magnetic properties, including low core loss and high permeability.

Desired electrical properties of steels used for making motor laminations are low core loss and high permeability. Those steels which are stress relief annealed after punching also should have properties which minimize distortion, warpage and delamination during the annealing of the lamination stacks.

Continuously annealed, silicon steels are conventionally used for motors, transformers, generators and similar electrical products. Continuously annealed silicon steels can be processed by techniques well known in the art to obtain low core loss and high permeability. Since these steels are substantially free of strain, they can be used in the as-punched condition (in which the steel as sold is commonly referred to as fully processed) or if better magnetic properties are desired the steel can be finally annealed by the electrical apparatus manufacturer after punching of the laminations (in which case the steel as sold is commonly referred to as semi-processed) with little danger of delamination, warpage, or distortion. A disadvantage of this practice is that the electrical steel sheet manufacturer is required to have a continuous annealing facility.

In order to avoid a continuous annealing operation, practices have been developed to produce cold rolled motor lamination steel by standard cold rolled sheet processing including batch annealing followed by temper rolling. In order to obtain the desired magnetic properties of high permeability and low core loss, it has been considered necessary to temper roll the steel with a heavy reduction in thickness on the order of 7%. Electrical steels processed by batch annealing and heavy temper rolling followed by a final stress relief anneal after the punching operations develop acceptable core loss and permeability through a complete recrystallization process. Unfortunately, the heavy temper rolling necessary for development of magnetic properties often results in delamination, warpage and distortion of the intermediate product when it is annealed, to the degree that it is unsuitable for service.

Fully-processed electrical steels are used by customers in the as-punched/stamped condition without a subsequent annealing operation being required. Standard cold-rolled electrical steels are unsuitable for most fully-processed applications due to strain remaining in the material. Fully processed materials are produced utilizing continuous anneal lines since no additional strain is required to provide acceptable flatness. Batch annealed materials, however, do not have acceptable flatness and require some strain simply to provide a flat product, which generally degrades the magnetic properties beyond a usable range. This strain is usually provided by conventional temper rolling.

For traditional cold-rolled motor lamination electrical steels, magnetic property performance is measured by standard Epstein testing at a nominal induction of 1.5 Tesla. However, once incorporated into an electrical device, the steel is not magnetically optimized for use at operating inductions below 1.5 Tesla.

Conventional hot rolling practices for non-hot band annealed cold-rolled motor lamination electrical steels have used high hot rolling finishing temperatures typically accomplished in the austenite region, and high coiling temperatures to promote "self-annealing" of the generated hot band. This practice has been previously determined to produce optimal magnetic properties. However, for some steel products specifically requiring improved cleanliness levels, this practice is unsatisfactory due to the formation of heavy subsurface oxidation. Using lower coiling temperatures has traditionally degraded magnetic properties, specifically permeability levels, due to less time-at-temperature for self-annealing.

SUMMARY OF THE INVENTION

An object of the present invention is to provide a batch annealed and temper rolled motor lamination steel having magnetic and mechanical properties similar to silicon electrical steels produced by continuous annealing without temper rolling.

A more particular object of the invention is to provide a batch annealed and temper rolled motor lamination steel which can be given a final stress relief anneal to achieve low core loss and high permeability without delamination, warpage or distortion of the intermediate product produced by the electrical product manufacturer.

Another object of the invention is to provide a batch annealed and temper rolled motor lamination steel which displays acceptable core loss and permeability without a final stress relief anneal operation.

The present invention applies to the production of batch annealed and temper rolled motor lamination steels which are semi-processed, i.e. steels which are given a final stress relief anneal after punching, and fully processed steels, i.e. steels which are used in the as-punched condition without a final stress relief anneal. In both instances, the process of the invention is characterized by a composition having an ultra low carbon content less than 0.01%, preferably less than 0.005%, and either leveling with preferably no change in thickness or light temper rolling with a reduction in thickness of less than 1.0%, and, preferably, less than 0.5%.

A preferred embodiment of the process provided by the invention for making both semi-processed and fully processed electrical steel comprises the steps of:

hot rolling a slab into a strip having a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

followed by coiling, pickling, annealing, cold rolling and batch annealing the strip, and then temper rolling the strip with a reduction in thickness of less than 1.0%.

In the case of semi-processed steel which is given a final stress relief anneal after punching, the steel can be hot rolled with a finishing temperature in either the austenite or ferrite region. Hot rolling with a finishing temperature in the austenite region results in optimum permeability after the stress relief anneal. Hot rolling with a finishing temperature in the ferrite region results in optimum core loss with lower permeability after the final stress relief anneal. In the case of fully processed steels which are not given a final stress relief anneal, optimum core loss and permeability are achieved when the steels are hot rolled with a finishing temperature in the austenite region.

In the case of both semi-processed and fully processed steels, the combination of ultra low carbon content, pickle band annealing, and light temper rolling results in low core loss and high permeability. If the punched steel product is given a final stress relief anneal, the light temper roll of less than 1.0% and more particularly less than 0.5%, minimizes the residual stresses that are thought to be responsible for the occurrence of delamination, warpage and distortion.

Another embodiment of the invention relates to a method of making electrical steel strip characterized by low core loss and high permeability, comprising the steps of:

producing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

hot rolling the slab into a strip with a finishing temperature in the austenite region;

coiling the strip at a temperature ranging from 1300°–1450° F.;

followed by pickling, annealing, cold rolling, batch annealing, and temper rolling the strip with a reduction in thickness of less than 1.0% and, preferably, no greater than 0.5%.

Still another embodiment of the invention relates to a method for the production of electrical steel strip characterized by low core loss and high permeability comprising the steps of:

hot rolling a slab into a strip having a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

followed by coiling, pickling, cold rolling and batch annealing the strip, and then flattening the strip with a leveling process. Although it is not required, the strip may also be pickle band annealed.

The hot rolling step is conducted in either the ferrite region or the austenite region. The leveling process includes roller leveling with no reduction in thickness of the strip, or tension leveling. The tension leveled strip has an elongation less than 1.0% and, preferably, less than 0.5%. This method is advantageous in that it does not require a continuous anneal facility or temper rolling apparatus, but rather only requires standard batch annealing and leveling facilities.

Another embodiment of the invention relates to a method of making electrical steel strip characterized by low core loss and high permeability which, once it is incorporated into an electrical device, is magnetically optimized for use at operating inductions below 1.5 Tesla. This method comprises the steps of:

providing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

reheating the slab at a temperature less than 2300° F.;

hot rolling the slab into a strip with a finishing temperature in the ferrite region;

coiling the strip at a temperature less than 1200° F.;

followed by pickling, annealing, cold rolling, batch annealing, and temper rolling the strip with a reduction in thickness of less than 1.0%.

More particularly, the step of reheating the slab is carried out at a temperature ranging from about 2100°–2275° F. This reheating is carried out at a maximum preheat temperature of 2105° F., a maximum heating temperature of 2275° F., and a maximum soak temperature of 2275° F. The hot rolling finishing temperature ranges from 1500°–1650° F. The step of coiling is carried out at a temperature of about 1000° F. The temper rolling is carried out with a reduction in thickness no greater than 0.5%.

Yet another embodiment of the invention overcomes the traditional disadvantages of degraded permeability due to lower coiling temperatures. This method uses a hot rolling practice with a finishing temperature in the ferrite region and intermediate level coiling temperatures to promote improved magnetic properties with good strip cleanliness without a pickle band anneal.

In preferred form, this method of making electrical steel strip without a pickle band anneal characterized by low core loss and high permeability comprises the steps of:

producing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

hot rolling the slab into a strip with a finishing temperature in the ferrite region;

coiling the strip at a temperature of 1100°–1350° F.;

followed by cold rolling, batch annealing, and temper rolling the strip with a reduction in thickness no greater than 1.0%.

By hot rolling with a finishing temperature in the ferrite region and coiling at intermediate temperatures, self annealing occurs. As a result of the self-annealing there is a recrystallization of the ferrite to a relatively large grain size. The steel thus has an equiaxed grain ferrite microstructure. Thus, this method of the invention produces steel having good magnetic properties without conducting pickle band annealing or other hot band anneal practices traditionally required to attain similar magnetic properties.

Other objects and a fuller understanding of the invention will be had from the following description of preferred embodiments and the accompanying drawings.

DESCRIPTION OF PREFERRED EMBODIMENTS

Figure 2:
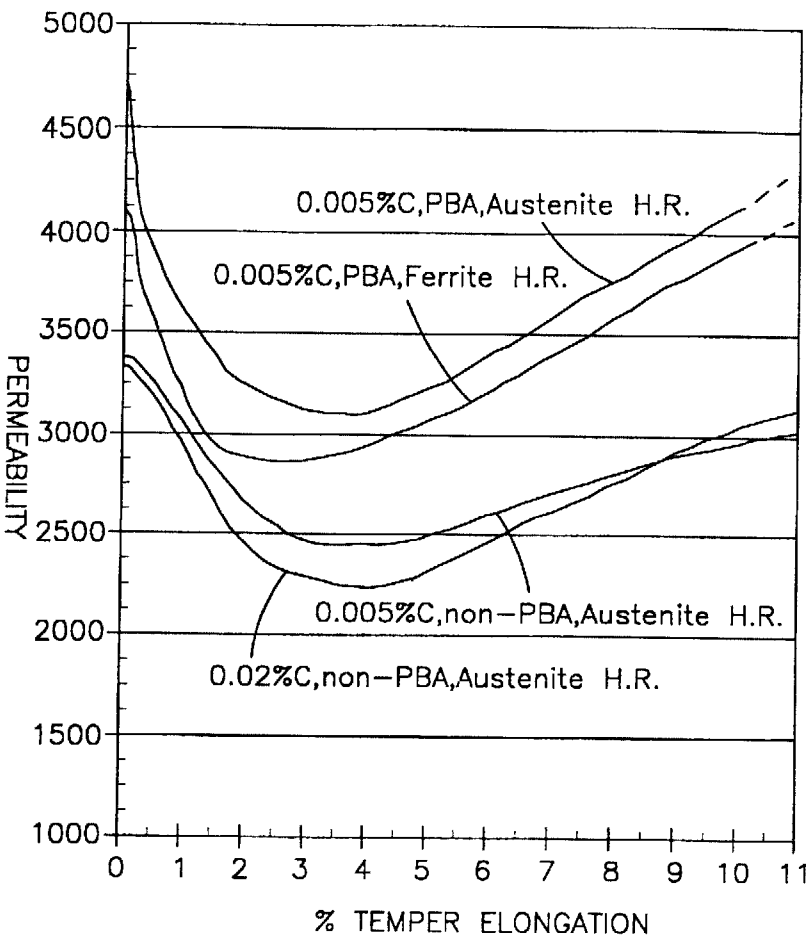
FIG. 2 is a graph showing permeability after stress relief annealing (Gauss/Oersted at an induction of 1.5 Tesla) versus % temper elongation for four semi-processed steels, two of which are made according to the present invention.

One embodiment of the invention relates to a process involving an ultra low carbon steel, i.e. a steel having a carbon content less than 0.01%, and, preferably, no greater than 0.005% by weight, which is pickle band annealed prior to cold rolling, batch annealed after cold rolling, and temper rolled with a light reduction in thickness, i.e. no greater than 1.0%, and, preferably, no greater than 0.5%. Steels processed in this manner are useful in semi-processed applications in which the intermediate products made by the electrical manufacturer are given a stress relief anneal and in fully processed applications in which the temper rolled steel sold by the steel sheet producer is used by the manufacturer in the as-punched condition without being given a final stress relief anneal. It has been found that in both instances the combination of ultra low carbon content, pickle band annealing and light temper rolling results in good magnetic and mechanical properties.

The steel composition consists generally of up to 0.01% C, 0.20–1.35% Si, 0.10–0.45% Al, 0.10–1.0% Mn, up to 0.015% S, up to 0.006% N, up to 0.07% Sb, and up 0.12% Sn. *The balance of the composition is substantially iron.* More specifically compositions include less than 0.005% C, 0.25–1.0% Si, 0.20–0.35% Al, and less than 0.004% N. Suitable amounts of Sb are from 0.01–0.07% by weight, and, more preferably, from 0.03–0.05%. Less preferably, Sn may be used in a typical range of from 0.02–0.12%.

In accordance with the invention in this and in other embodiments, semi-processed steels may have a composition including a carbon content slightly higher than up to 0.01%. For example, a carbon content of up to 0.02% may be used.

In carrying out the process of the invention, a steel slab of the indicated composition is hot rolled into a strip, coiled, pickled and pickle band annealed. In the case of steels which are hot rolled with a finishing temperature in the ferrite region, the strip is preferably coiled at a temperature no greater than 1200° F., and preferably, no greater than 1050° F. The lower coiling temperatures result in less subsurface oxidation in the hot band. Coiling temperatures less than 1200° F. are preferred in order to retain the cold worked ferrite grain structure. In the case of steels which are hot rolled with a finishing temperature in the austenite region, coiling temperatures ranging from 1300°–1450° F. are preferred to promote self annealing. The pickle band anneal is carried out at a temperature that usually ranges from about 1350°–1600° F., and more specifically from 1400°–1550° F.

Following the pickle band anneal, the strip is cold rolled and batch annealed. The cold rolling reduction typically ranges from 70–80%. The batch anneal operation is carried out in a conventional manner at a coil temperature ranging from 1100°–1350° F.

In accordance with the invention, the batch annealed strip is temper rolled with a light reduction in thickness no greater than 1.0%, and, more preferably, no greater than 0.5%. In the case of fully processed steels, the light temper roll is important in obtaining low core loss and good permeability. In the case of semi-processed steels, the light temper roll is critical to avoiding delamination, warpage and distortion when the intermediate product is stress relief annealed.

The following Table 1 sets forth the magnetic properties of semi-processed steels which were given a stress relief anneal. The stress relief anneal was carried out in a conventional manner by soaking for 90 minutes at 1450° F. in an HNX atmosphere having a dew point of from 50°–55° F. The steels reported in Table 1 had a nominal composition of 0.35% Si, 0.25% Al, 0.55% Mn, 0.007% S, 0.004% N, 0.04% P, 0.03% Sb, and C in the amount indicated in the table, *with the balance of the composition being substantially iron.*

TABLE 1

| Examples | % C | Processing | Magnetic Properties Core Loss (w/lb/mil) | Permeability (G/Oe) | Thickness (inch) |
|---|---|---|---|---|---|
| A | 0.005 | Hot Rolling — 1720° F. Finishing and 1420° F. Coiling, Pickle, Pickle Band Anneal, Cold Roll, Batch Anneal, Temper Roll 0.5% | 0.127 | 4035 | 0.0233 |
| B | 0.005 | Hot Rolling — 1530° F. Finishing and 1000° F. Coiling, Pickle, Pickle Band Anneal, Cold Roll, Batch Anneal, Temper Roll 0.5% | 0.116 | 2829 | 0.0214 |
| C | 0.02 | Hot Rolling — 1720° F. Finishing and 1420° F. Coiling, Pickle, Cold Roll, Batch Anneal, Temper Roll 7% | 0.123 | 2732 | 0.0220 |

The steels of Examples A and B were made according to the invention with a carbon content of 0.005% and a light temper reduction of 0.5%. Example A was hot rolled with a finishing temperature in the austenite region (1720° F.), while Example B was hot rolled with a finishing temperature in the ferrite region (1530° F.). It will be seen that rolling in the ferrite region improved the core loss while sacrificing some permeability.

Example C is a 0.02% C steel which was given a heavy temper reduction of 7.0%. A comparison of the properties of Examples A and C shows the improvement in permeability which is achieved with the lower carbon level and lighter temper reduction.

Figure 1:
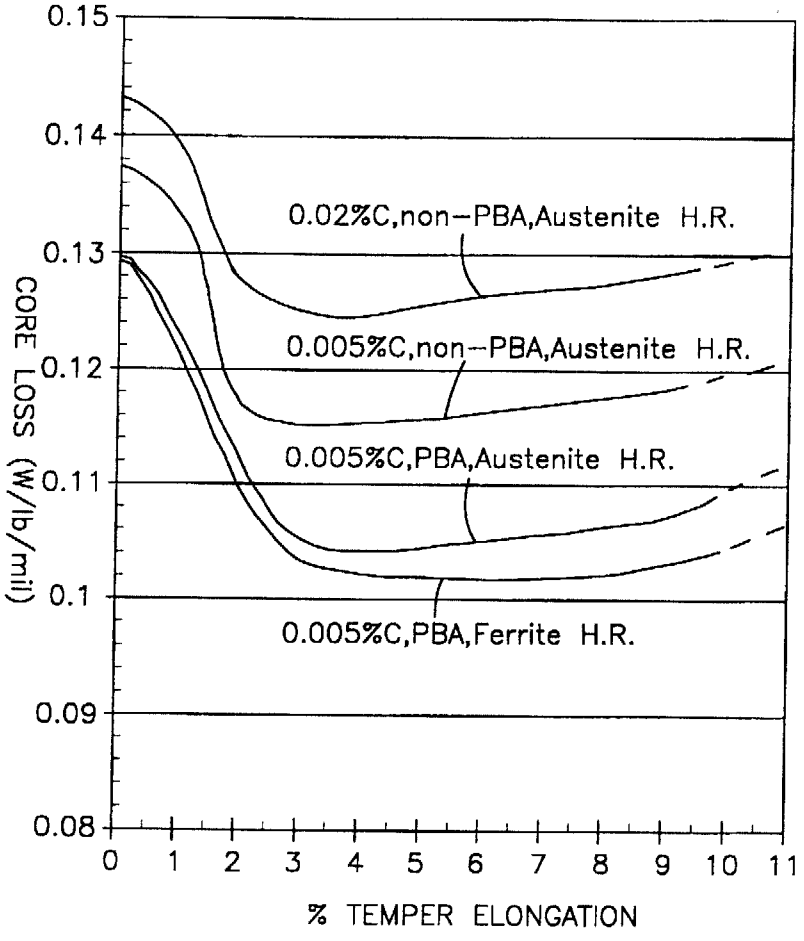
FIG. 1 is a graph showing core loss/unit thickness (Watts/lb/mil) after stress relief annealing versus % temper elongation for four semi-processed steels, two of which are produced in accordance with the present invention.

FIGS. 1 and 2 show the improved magnetic properties of semi-processed steels which are given a pickle band anneal in accordance with the invention compared to the properties of steels processed without a pickle band anneal. The steels had the same nominal composition as the steels reported in Table 1 and were given the same stress relief anneal.

As shown in FIG. 1, the two 0.005% C steels which were hot rolled with a finishing temperature in the austenite and ferrite regions and given a pickle band anneal exhibited the lowest core losses. The worst core loss occurred with a 0.02% carbon steel which was not given a pickle band anneal; a lower carbon content of 0.005% demonstrated better core loss.

Referring to FIG. 2, it will be seen that the two 0.005% carbon steels which were given a pickle band anneal exhibited the best permeability, while the two steels which were not given a pickle band anneal displayed lower permeabilities. The worst permeability was exhibited by a steel having a carbon content 0.02%.

The following Table 2 sets forth the magnetic properties of fully processed steels, i.e. steels which were not given a final stress relief anneal. The steels reported in Table 2 had the same nominal composition as the steels reported in Table 1.

TABLE 2

| Examples | % C | Processing | Magnetic Properties Core Loss (w/lb/mil) | Permeability (G/Oe) | Thickness (inch) |
|---|---|---|---|---|---|
| D | 0.02 | Hot Rolling — 1720° F. Finishing and 1420° F. Coiling, Pickle, Pickle Band Anneal, Cold Roll, Batch Anneal, Temper Roll 0.5% | 0.193 | 941 | 0.0280 |
| E | 0.005 | Hot Rolling — 1530° F. Finishing and 1420° F. Coiling, Pickle, Pickle Band Anneal, Tandem Roll, Batch Anneal, Temper Roll 0.5% | 0.171 | 1244 | 0.0229 |
| F | 0.005 | Hot Rolling — 1530° F. Finishing and 1000° F. Coiling, Pickle, Pickle Band Anneal, Cold Roll, Batch Anneal, Temper Roll 0.5% | 0.213 | 951 | 0.0217 |
| G | 0.005 | Hot Rolling — 1530° F. Finishing and 1000° F. Coiling, Pickle, Pickle Band Anneal, Cold Roll, Batch Anneal, Temper Roll 7% | 0.248 | 634 | 0.0215 |
| H | 0.02 | Hot Rolling — 1720° F. Finishing and 1420° F. Coiling, Pickle, Cold Roll, Batch Anneal, Temper Roll 7% | 0.289 | 694 | 0.0253 |

The steel of Example D was made with a carbon content of 0.02%, while the steel of Example E was made in accordance with the invention from an ultra low carbon steel having a carbon content of 0.005%. These steels were similarly processed, including a pickle band anneal and a light temper reduction of 0.5%. It will be seen that lowering the carbon from 0.02% to 0.005% improved the as-punched/sheared magnetic properties.

The steel of Example F was an ultra low carbon steel which was hot rolled to a finishing temperature in the ferrite region and given a light temper reduction of 0.5%. It will be seen that the magnetic properties of Example E which was a steel finished in the austenite region were superior to those of steel of Example F finished in the ferrite region. Thus, for fully processed applications, the preferred process of the invention involves finishing in the austenite region.

The steel of Example G is an ultra low carbon content steel similar to Example F except that the steel of Example G was given a heavy temper reduction of 7.0%. It will be seen from a comparison of the magnetic properties of Examples F and G that the lowest core loss and highest permeability are achieved with a light temper reduction.

Example H is a 0.02% carbon steel which was not given a pickle band anneal and was finished with a heavy temper reduction of 7.0%. A comparison of Examples D and H shows the improvement in as-punched/sheared magnetic properties achieved with light temper rolling and pickle band annealing versus heavy temper rolling and no pickle band annealing.

In all embodiments of the invention, the light temper rolling process may be replaced by a leveling process. The present method is thus advantageous in that it does not require a continuous anneal facility or temper rolling apparatus, but rather only requires standard batch annealing and leveling facilities. The leveling process is preferably roller leveling, although tension leveling may also be used. The leveling process selectively elongates portions of the steel strip to proportionally stretch shorter areas beyond the yield point of the steel. This produces generally uniform so-called "fiber" length in the strip.

In the roller leveling process the strip moves in a wave-like path through up and down bends between upper and lower sets of parallel small diameter rolls. This makes the shorter fibers travel longer path lengths. The depths of the up/down bends are gradually reduced between the entrance and the exit of the leveling machine. This eliminates the curvature in the strip caused by entry into the leveling machine. All of the fibers have the same length upon exiting the leveling machine, the strip thus being flattened or leveled. Importantly, the strip thickness is not reduced in roller leveling in contrast to temper rolling. Replacing the temper rolling process with the leveling process is especially preferable when producing fully processed steel according to the methods of the invention.

Tension leveling produces a flat steel strip by stretching the strip lengthwise. Elongation of the strip up to 3.0% can occur on standard leveling process equipment. However, in the present invention strip elongation is controlled to less than 1.0% and, preferably, to less than 0.5%. Roller leveling produces steel having better magnetic properties compared to tension leveling.

One embodiment of the invention utilizing a leveling process relates to a method for the production of electrical steel strip characterized by low core loss and high permeability. This method employs an ultra low carbon steel, i.e. a steel having a carbon content less than 0.01%, and, preferably, no greater than 0.005% by weight. The steel composition consists generally of up to 0.01% C, 0.20–1.35% Si, 0.10–0.45% Al, 0.10–1.0% Mn, up to 0.015% S, up to 0.006% N, up to 0.07% Sb, and up to 0.12% Sn. *The balance of the composition is substantially iron.* More specific compositions include less than 0.005% C, 0.25–1.0% Si, 0.20–0.35% Al, and less than 0.004% N. Suitable amounts of Sb are from 0.01–0.07% by weight, and, more preferably, from 0.03–0.05%. Less preferably, Sn may be used in a typical range of from 0.02–0.12%.

In carrying out the process of the invention, a slab having the indicated composition is hot rolled into a strip in either the ferrite region or the austenite region. The strip is then subjected to the steps of coiling at 1300°–1450° F. for austenite hot rolling and 1000°–1350° F. for ferrite hot rolling, and pickling. Although it is not required, the strip may also be pickle band annealed. The pickle band anneal is carried out at a temperature that usually ranges from about 1350°–1600° F., and more specifically from 1400°–1550° F.

Following the pickling or pickle band anneal, the strip is cold rolled and batch annealed. The cold rolling reduction typically ranges from 70–80%. The batch anneal operation is carried out in a conventional manner at a coil temperature ranging from 1100°–1350° F.

The strip is then flattened with a leveling process. The leveling process includes roller leveling with no reduction in thickness of the strip, or tension leveling. The tension leveled strip has an elongation less than 1.0% and, preferably, less than 0.5%. Preferably, the strip is subjected to roller leveling with no reduction in thickness. In the case of semi-processed steel, this method also includes the step of a final stress relief anneal.

The following Table 3 sets forth the magnetic properties of fully processed steels, i.e., steels which were not given a final stress relief anneal. These steels were subjected to roller and tension leveling processes instead of a temper rolling process. The steels reported in Table 3 had the same nominal composition as the steels reported in Table 1.

TABLE 3

| Examples | % C | Processing | Magnetic Properties Core Loss (w/lb) | Permeability (G/Oe) | Thickness t (inch) final t | Δt % |
|---|---|---|---|---|---|---|
| I | 0.005 | Hot Rolling, Coiling, Pickle, Cold Roll, Batch Anneal, Roller Level | 4.5–5.5 | 1000–1200 | 0.025 | 0 |
| J | 0.005 | Hot Rolling Coiling, Pickle, Cold Roll, Batch Anneal, Tension Level | 5.7 | 800–900 | 0.028 | 0.2 |

It will be seen from Table 3 that both Examples I and J exhibited good magnetic properties. Roller leveling in Example I produced higher permeability and lower core loss than the tension leveling in Example J.

Another embodiment of the invention relates to a method of making electrical steel strip for application in electrical devices operating at an induction level of less than 1.5 Tesla, characterized by low core loss and high permeability. This method uses an ultra low carbon steel, i.e. a steel having a carbon content less than 0.01%, and, preferably, no greater than 0.005% by weight. The steel composition consists generally of up to 0.01% C, 0.20–1.35% Si, 0.10–0.45% Al, 0.10–1.0% Mn, up to 0.015% S, up to 0.006% N, up to 0.07% Sb, and up to 0.12% Sn. *The balance of the composition is substantially iron.* More specific compositions include less than 0.005% C, 0.25–1.0% Si, 0.20–0.35% Al, and less than 0.004% N. Suitable amounts of Sb are from 0.01–0.07% by weight, and, more preferably, from 0.03–0.05%. Less preferably, Sn may be used in a typical range of from 0.02–0.12%.

In carrying out this method of making electrical steel strip at an induction level of less than 1.5 Tesla, a slab of the indicated composition is reheated at a temperature less than 2300° F. During reheating, the steel is passed through a primary zone, an intermediate zone and a soak zone of a reheat furnace. The maximum primary zone temperature is 2105° F., the maximum intermediate zone temperature is 2275° F., and the maximum soak zone temperature is 2275° F.

The steel slab is then hot rolled into a strip with a finishing temperature in the ferrite region. This ferrite finishing temperature is preferably 1500°–1650° F. However, it will be understood that the finishing temperatures may vary according to the grade of steel used in this and the other embodiments of the invention.

The strip is then coiled at a temperature less than 1200° F. More preferably, the coiling temperature is about 1000° F. The lower coiling temperatures result in less subsurface oxidation in the hot band and, because the strips are hot rolled in the ferrite region, retain the cold worked ferrite grain structure.

The strip is then pickled and pickle band annealed. The pickle hand anneal is carried out at a temperature that usually ranges from about 1350°–1600° F., and more specifically from 1400°–1550° F.

Following the pickle band anneal, the strip is cold rolled and batch annealed. The cold rolling reduction typically ranges from 70–80%. The batch anneal operation is carried out in a conventional manner at a coil temperature ranging from 1100°–1350° F.

In accordance with the invention, the batch annealed strip is preferably temper rolled with a light reduction in thickness no greater than 1.0%, and, more preferably, no greater than 0.5%. In the case of fully processed steels, the light temper roll is important in obtaining low core loss and good permeability. In the case of semi-processed steels, the light temper roll is critical to avoiding delamination, warpage and distortion when the intermediate product is stress relief annealed.

Figure 4:
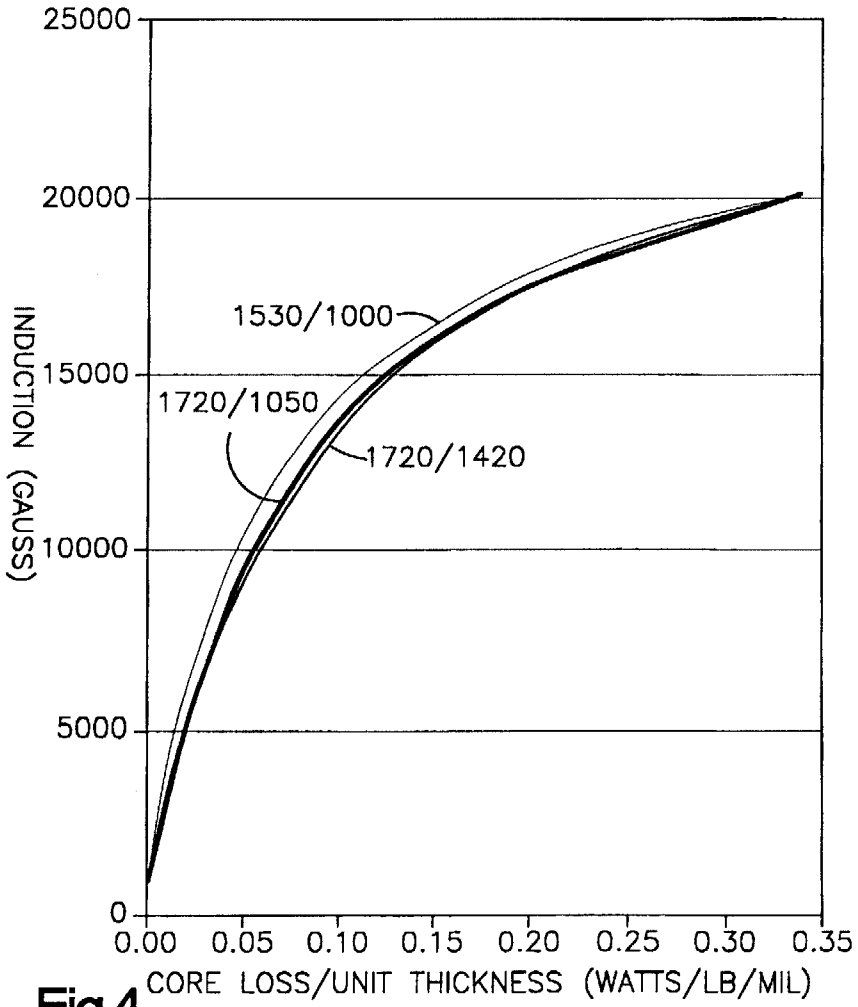
FIG. 4 is a graph showing induction (Gauss) versus core loss/unit thickness (Watts/lb/mil) for three steels finished and coiled at different temperatures, two of which are made according to the present invention.
Figure 3:
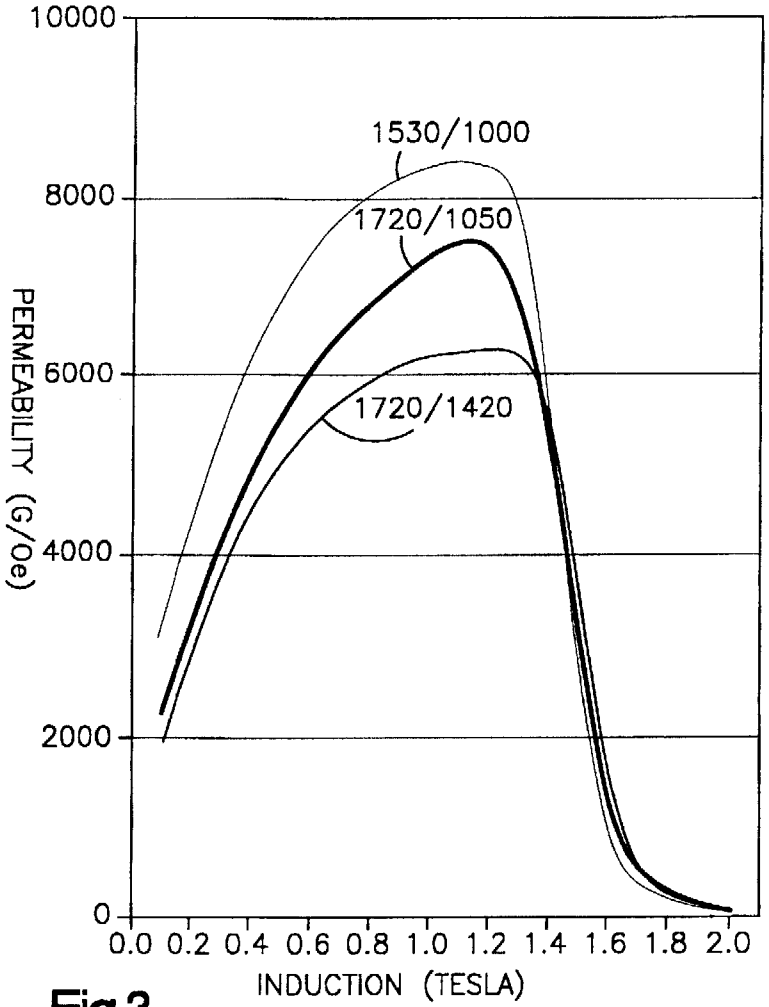
FIG. 3 is a graph showing permeability (Gauss/Oersted) versus induction (Tesla) for three steels coiled at different temperatures, two of which are made according to the present invention.

FIGS. 3 and 4 show electrical steel strip made according to the method of the invention characterized by low core loss, and by high permeability, in particular, at an induction level of less than 1.5 Tesla. These figures show the effect of the coiling temperature on magnetic properties.

Referring to FIG. 3, it will be seen that the ferrite finished product with a coiling temperature of 1000° F. resulted in the best permeability, while the austenite finished product with a coiling temperature of 1050° F. had better permeability than steel austenite finished and coiled at 1420° F., which coiling temperature was outside the range of this embodiment of the invention. The highest permeability of about 8800 Gauss/Oersted was obtained by ferrite finished steel having a coiling temperature of about 1000° F. at an induction of less than about 1.5 Tesla.

Referring to FIG. 4, it will be seen that at any particular induction at least between about 5000–19000 Gauss, steel ferrite finished and coiled at 1000° F. had lower core loss than steel austenite finished and coiled at 1050° F. and 1420° F.

Yet another embodiment of the invention relates to a process of making electrical steel strip without a hot band anneal, characterized by low core loss and high permeability. This method employs an ultra low carbon steel, i.e. a steel having a carbon content less than 0.01 %, and, preferably, no greater than 0.005% by weight. The steel composition consists generally of up to 0.01% C, 0.20–1.35% Si, 0.10–0.45% Al, 0.10–1.0% Mn, up to 0.015% S, up to 0.006% N, up to 0.07% Sb, and up to 0.12% Sn. *The balance of the composition is substantially iron.* More specific compositions include less than 0.005% C, 0.25–1.0% Si, 0.20–0.35% Al, and less than 0.004% N. Suitable amounts of Sb are from 0.01–0.07% by weight, and, more preferably, from 0.03–0.05%. Less preferably, Sn may be used in a typical range of from 0.02–0.12%.

In carrying out the process of the invention, a steel slab of the indicated composition is hot rolled into a strip with a finishing temperature in the ferrite region.

The strip is then coiled at an intermediate temperature ranging from 1100°–1350° F. and, preferably, about 1200° F. No hot band anneal, for example, a pickle band anneal is necessary after this coiling step.

Following the coiling, the strip is cold rolled and batch annealed. The cold rolling reduction typically ranges from 70–80%. The batch anneal operation is carried out in a conventional manner at a coil temperature ranging from 1100°–1350° F.

In accordance with the invention, the batch annealed strip is preferably temper rolled with a light reduction in thickness no greater than 1.0%, and, preferably, no greater than 0.5%. In the case of fully processed steels, the light temper roll is important in obtaining low core loss and high permeability. In the ease of semi-processed steels, the light temper roll is critical to avoiding delamination, warpage and distortion when the intermediate product is stress relief annealed.

Figure 6:
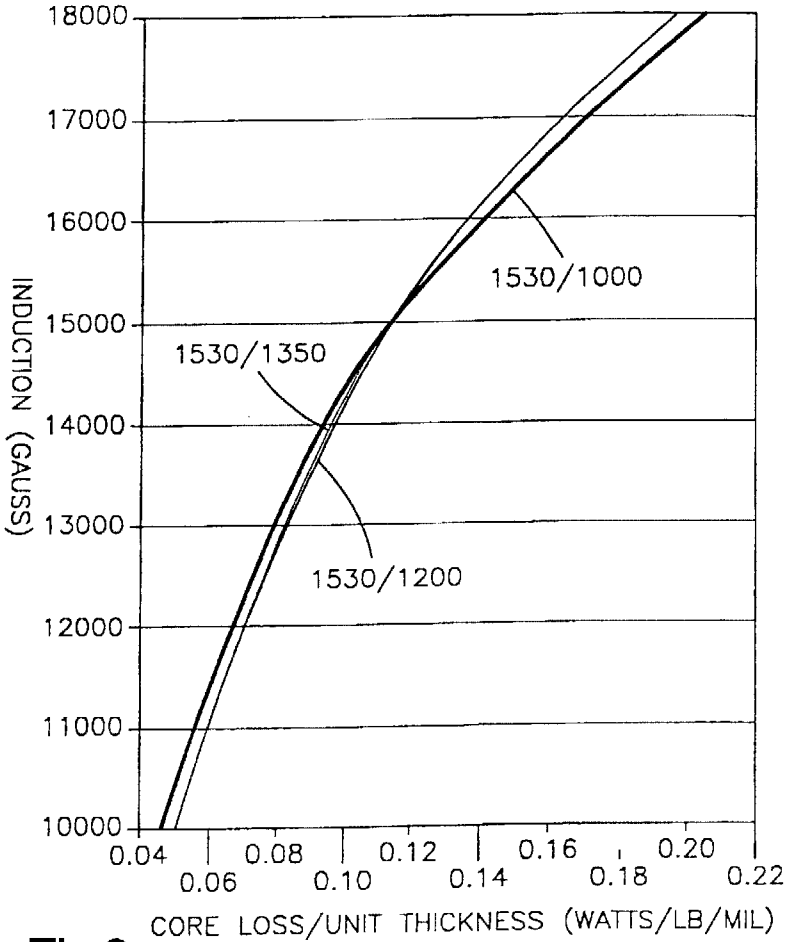
FIG. 6 is a graph showing induction (Gauss) versus core loss/unit thickness (Watts/lb/mil) for three steels coiled at different temperatures, two of which are made according to the present invention.
Figure 5:
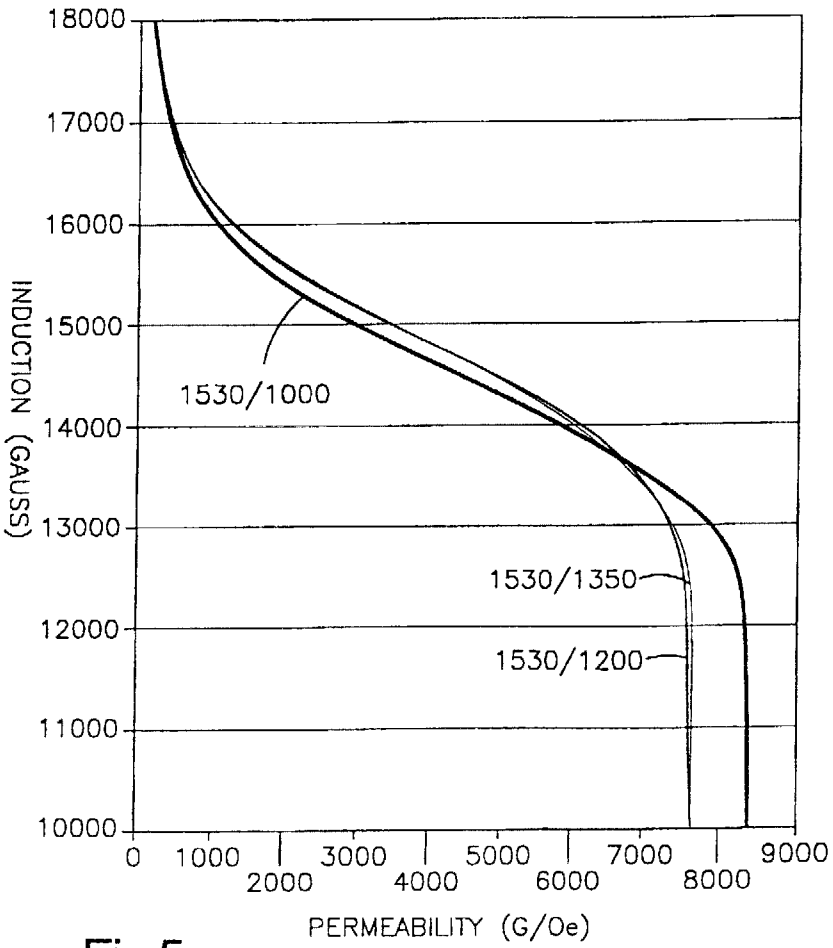
FIG. 5 is a graph showing induction (Gauss) versus permeability (Gauss/Oersted) for three steels coiled at different temperatures, two of which are made according to the present invention.

FIGS. 5 and 6 show electrical steel strip made according to this method of the invention characterized by low core loss and high permeability. These Figures show that for steel produced according to the method of the invention with a hot roll finishing temperature in the ferrite region and with no hot band anneal, better magnetic properties are often obtained at intermediate coiling temperatures than at a lower temperature.

In particular, hot rolling with a ferrite finishing temperature followed by intermediate temperature coiling results in self-annealing of the steel, during which the ferrite recrystallizes to a relatively large grain size. This promotes improved magnetic properties in non-hot band annealed electrical steels. Moreover, the lower coiling temperatures prevent the extensive growth of subsurface oxidation in the cooling hot band, and thus yield an improved level of cleanliness upon finish processing.

Referring to FIG. 5 it will be seen that for any induction at least between about 14000 and 16400 Gauss, steels coiled according to the invention at intermediate temperatures of 1200° F. and 1350° F. had higher permeability than steel coiled at 1000° F., outside the intermediate coiling temperature range of this embodiment of the invention.

Referring to FIG. 6, it will be seen that for any induction at least between about 15400 and 18000 Gauss, steels coiled according to the invention at intermediate temperatures of 1200° F. and 1350° F. had lower core loss than steel coiled at 1000° F., outside the intermediate coiling temperature range of this embodiment of the invention.

Many modifications and variations of the invention will be apparent to those skilled in the art from the foregoing detailed description. Therefore, it is to be understood that, within the scope of the appended claims, the invention can be practiced otherwise than as specifically disclosed.

What is claimed is:

1. A method of making electrical steel strip characterized by low core loss and high permeability comprising the steps of:

producing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

hot rolling the slab into a strip with a finishing temperature in the austenite region;

coiling the strip at a temperature ranging from 1300°–1450° F.;

followed by the sequential steps of annealing the strip, cold rolling the strip, batch annealing the strip, and temper rolling the strip, wherein said temper rolling reduces the thickness of the strip by an amount ranging from about 0.25 to about 0.6% and the strip has a permeability when stress relief annealed of at least 2500 Gauss/Oersted.

2. The method of claim 1 wherein said step of temper rolling is carried out with a reduction in thickness ranging from about 0.25 to 0.5%.

3. The method of claim 1 further comprising stress relief annealing the strip.

4. The method of claim 3 wherein said temper rolling step is carried out at a reduction in thickness ranging from about 0.25 to 0.5%.

5. The method of claim 1 wherein a coil of the strip is heated during said batch annealing at a coil temperature of less than 1350° F.

6. The method of claim 1 wherein said permeability is obtained at an induction of less than about 1.5 Tesla.

7. The method of claim 1 wherein the strip has a core loss when stress relief annealed of not greater than 0.13 watts/pound/mil.

8. A method of making electrical steel strip characterized by low core loss and high permeability comprising the steps of:

producing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |

-continued

| | |
|---|---|
| N: | up to 0.006 |
| Sb: | up to 0.07 |
| Sn: | up to 0.12, *and* |
| *the balance being substantially iron,* | |

reheating the slab at a temperature ranging from 2100°–2275° F.;

hot rolling the slab into a strip with a finishing temperature in the ferrite region;

coiling the strip at a temperature less than 1200° F.;

followed by the sequential steps of annealing the strip, cold rolling the strip, batch annealing the strip, and temper rolling the strip, wherein said temper rolling reduces the thickness of the strip by an amount ranging from about 0.25 to about 0.6% and the strip has a permeability when stress relief annealed of at least 2500 Gauss/Oersted.

9. The method of claim 8 wherein said step of temper rolling is carried out with a reduction in thickness ranging from about 0.25 to 0.5%.

10. The method of claim 8 wherein said step of coiling is carried out at a temperature of about 1000° F.

11. The method of claim 8 wherein said step of reheating the slab is carried out at a maximum preheat temperature of 2105° F., a maximum heating temperature of 2275° F., and a maximum soak temperature of 2275° F.

12. The method of claim 8 wherein said finishing temperature ranges from 1500°–1650° F.

13. The method of claim 8 including the step of stress relief annealing the strip after temper rolling.

14. The method of claim 13 wherein said temper rolling step is carried out at a reduction in thickness ranging from about 0.25 to 0.5%.

15. A method of making electrical steel strip without a hot band anneal characterized by low core loss and high permeability, comprising the steps of:

producing a slab with a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

hot rolling the slab into a strip with a finishing temperature in the ferrite region;

coiling the strip at a temperature less than 1200° F.;

followed by cold rolling the strip, batch annealing the strip, and temper rolling the strip, wherein said temper rolling reduces the thickness of the strip by an amount ranging from about 0.25 to about 0.6%, and the strip has a permeability when stress relief annealed of at least 2500 Gauss/Oersted.

16. The method of claim 15 further comprising the step of stress relief annealing the strip.

17. The method of claim 16 wherein said temper rolling step is carried out at a reduction in thickness ranging from about 0.25 to 0.5%.

18. A method of making electrical steel strip characterized by low core loss and high permeability comprising the steps of:

hot rolling a slab into a strip having a composition consisting essentially of (% by weight):

| | |
|---|---|
| C: | up to 0.01 |
| Si: | 0.20–1.35 |
| Al: | 0.10–0.45 |
| Mn: | 0.10–1.0 |
| S: | up to 0.015 |
| N: | up to 0.006 |
| Sb: | up to 0.07 |
| Sn: | up to 0.12, *and* |
| *the balance being substantially iron,* | |

followed by coiling the strip, cold rolling the strip and batch annealing the strip, and then flattening the strip with a leveling process, wherein the strip has a thickness that has been reduced by said leveling process by an amount ranging from about 0.25 to about 0.6% and the strip has a permeability when stress relief annealed of at least 2500 Gauss/Oersted.

19. The method of claim 18 wherein said tension leveling elongates the strip by an amount ranging from about 0.25 to about 0.5%.

20. The method of claim 18 wherein the slab is hot rolled with a finishing temperature in the ferrite region.

21. The method of claim 18 wherein the slab is hot rolled with a finishing temperature in the austenite region, and the strip is coiled at a temperature ranging from 1300°–1450° F. and annealed between the pickling and cold rolling steps.

22. The method of claim 18 wherein the slab is reheated at a temperature less than 2300° F. and hot rolled with a finishing temperature in the ferrite region, and the strip is coiled at a temperature less than 1200° F. and annealed between the pickling and cold rolling steps.

23. The method of claim 19 further comprising stress relief annealing the strip.

* * * * *